July 26, 1960 M. V. KALFAIAN 2,946,917

STORAGE TUBE

Filed Feb. 12, 1959 2 Sheets-Sheet 1

INVENTOR.

INVENTOR.
Megnia V. Kalfaian

United States Patent Office 2,946,917

Patented July 26, 1960

2,946,917

STORAGE TUBE

Meguer V. Kalfaian, 962 Hyperion Ave., Los Angeles, 29, Calif.

Filed Feb. 12, 1959, Ser. No. 792,857

11 Claims. (Cl. 315—12)

This invention relates to devices for storing and reproducing plurality of electrical signal quantities, and particularly to a device for storing plurality of electrical signal quantities, reproducible many times without appreciable degradation, and with single control means for fast dissipation of said quantities. The main object is to provide a storage tube of the cathode ray type, capable of storing large quantities of electrical energy at varying levels, reproducible many times without appreciable degradation, and which may be dissipated within a very short period of time by the application of a narrow control pulse.

Storage tubes are utilized for accepting and retaining electrically some non-repetitive phenomena, and reproducing it once or more at a later time for analytical study of it. In the case where these storage tubes are used for simple analog signal reproduction, or analog-to-digital conversion, signal-to-noise ratio requirements are not severe. But where half-tone transient studies are involved, the storage tube performance must be accurate in all respects. Such accuracy has so far been limited in the previously known types of storage tubes, and it is therefore the principal object of this invention to provide a storage tube which is capable of storing electrical quantities faithfully at varying levels; and which is capable of reproducing these quantities many times without appreciable degradation; and which further is capable of dissipating these quantities rapidly with only a single pulse control. The particular feature of this invention is the provision of a storage target structure, which consists of a plurality of target elements having large capacitances to first and second electrodes. These electrodes are coupled in parallel by a low impedance inductance for simultaneous charging, and connected to the electron source in series with low impedance modulator during charging of the elemental target capacitors. During reproduction time, the modulator path is switched to a high impedance load for many readings without causing appreciable discharge of said capacitors. When erasure of these charges is required, a narrow pulse is produced across the inductance, so as first, to modify the original parallel storage into series potential and dissipate it through the low impedance inductance during homeward return of said pulse. A polarized diode is used in parallel with the inductance, to avoid undesired oscillation by the production of said pulse.

Figure 1:
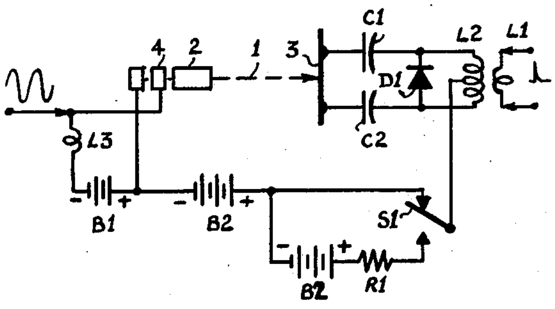
Fig. 1 shows a diagram of the system and associated circuit illustrating certain principles involved in the operation of apparatus in accordance with the invention.

The basic principle of operation of the storage system may best be understood by the simplified arrangement of Fig. 1, wherein, a stream of electrons 1, from source 2, is projected upon conductive target 3; connected to large capacitors C1 and C2. These capacitors are connected to end terminals of the secondary L2 of a pulse transformer, and its center tap further connected to the electron source 2 in series with switch S1 and battery B1. In this arrangement, the electron stream 1 charges capacitors C1 and C2 simultaneously to the potential of B1; driving the target 3 terminal to cathode potential, and the L2 terminals positive with respect to target 3. When the electron stream 1 is cut off from its source, these capacitors will hold their charges for a long time, depending on their power factor losses. These stored quantities may be reproduced by switching the center tap of L2 to R1 in series with battery B2, and interrupting the electron stream 1 by a high frequency voltage applied upon the intensity control grid 4 from across inductance L3. The resistor R1 is chosen to have high resistive value, and due also to the large values of C1 and C2, the original storage in these capacitors will not dissipate appreciably after many interruptions of beam-current flow. The amplitude of interrupted voltage appearing across R1 represents proportionally the voltage of B1. When the storage of capacitors C1 and C2 is required to be dissipated prior to another storage, the electron stream 1 is shut off and a voltage pulse is induced in inductance L2 from across primary L1. Due to the low impedance of L2, the like polarity voltages in capacitors C1 and C2 are simultaneously modified to the pulse voltage across L2. By adjusting the value of L2 to have resonance at the applied pulse, the capacitors C1 and C2 will discharge completely at the end of the pulse. The inclusion of a low impedance diode D1 will prevent reversal of the pulse voltage across inductance L2.

In storage tube techniques, it is desired that a large number of elemental capacitors are utilized, for storing voluminous information. There are a number of ways for constructing a target of plurality of large capacitors either in singular or two dimensional arrays. For example, the target utilized in the arrangement of Fig. 2 consists of a multiplicity of capacitors in a row of singular dimension, which by itself is useful for storing information in one time base, and reproducing it in another time base.

Figure 2:
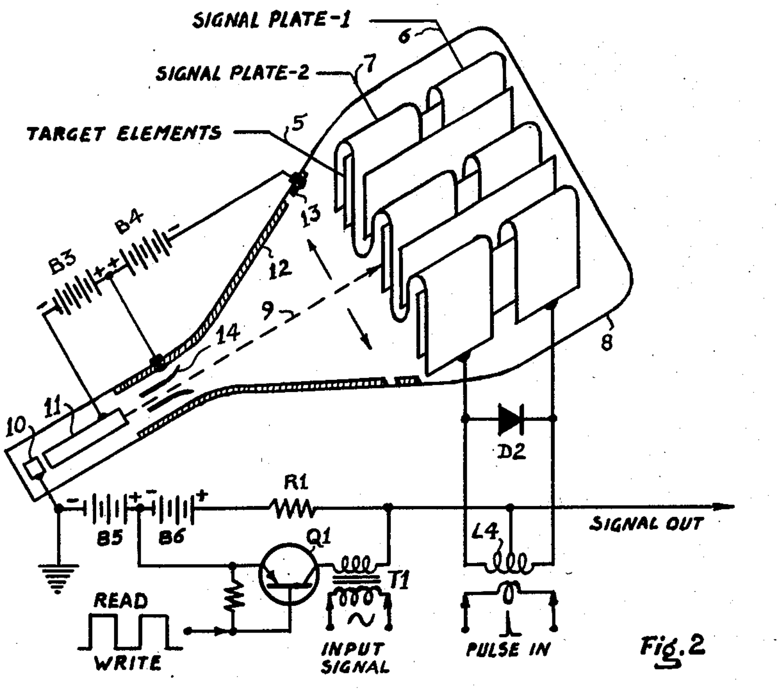
Fig. 2 is in part a perspective view of the storage device, including associated circuit diagram, showing an illustrative embodiment of the invention.

The target shown in the arrangement of Fig. 2 consists of a plurality of ribbon-like target elements 5, folded in first and second electrodes 6 and 7, designated as, signal plate 1 and signal plate 2, respectively. The target elements 5 are individually insulated from the electrodes 6 and 7, by means of insulating sheets therebetween; the latter of which are not shown in the drawing. Because of the folded flat surfaces between target elements 5 and the electrodes 6, 7, large capacitance may be easily secured with very thin insulating separation between the two, for example, by making the insulation 0.001 inch, or less, in thickness, with a dielectric time constant of more than unity. By connecting the electrodes 6 and 7 in parallel, for example, by the inductance L4, these capacitive values are doubled. The target is mounted in vacuum envelope 8, in a position that the target elements 5 face perpendicular to the normal axis of flow of electron beam 9. The stream of this electron beam originates in the emitter 10, followed by a well known beam-forming gun 11, and further by a beam accelerating anode 12. The anode 12 may either be independently formed as a cylindrical electrode, or it may be formed by conductive coating upon the inner wall of the cylindrical vacuum envelope 8. In this particular case, it is desired that the beam 9 arrives at the target at low velocity, and accordingly, a further cylindrical anode 13 is included adjacent the target; this anode also being in the form of conductive coating, if so desired. As will be noted in the arrangement, the gun 11 and anode 12 receive beam accelerating positive potential from source B3, but the anode 13 receives decelerating potential from source B4, the latter of which may be adjusted close to the potential of emitter 10. A pair of beam deflecting plates 14 is included for scanning the target elements 5 by the beam.

As indicated above, the electrodes 6 and 7 are connected to end terminals of inductance L4. From the center tap of this inductance, the two electrodes are coupled in parallel to the emitter 10 through either modulating path comprising transformer T1; gate transistor Q1; and voltage source B5; or, output load resistor R1; and voltage sources B5 and B6.

During storage of the incoming signals across transformer T1, assume that the transistor Q1 is conducting, the condition of which creates a low impedance electron return path via the target elements 5. As the electron beam scans the target elements from one end to the other, charging them to cathode potential, the charge in each element assumes a potential with respect to the electrodes 6 and 7 proportionally equal to the instantaneous signal potential existing across the secondary of transformer T1 in series with the potential of B5. When one scansion line is ended, the transistor Q1 is rendered inoperative, and the storage in elemental capacitors are ready for reproduction whenever desired. This reproduction is simply done by re-scanning the target elements by the beam 9; in this case the beam current flowing in series with load resistor R1 and series connected voltage sources B5 and B6. The value of resistor R1 is chosen to be high, and by virtue of the large capacitances of target elements, the original storage quantities are not altered appreciably by the scanning beam during reproduction time. For high signal-to-noise ratio, it is desired that the potential of B5 is at least 20 volts or more, and the potential of B6 may be equal to the potential of B5. Of course, these values are exemplary, and they may vary with the particular device made, and the magnitude of output signal desired to be obtained.

When erasure of the storage quantities in target elements 5 is desired, a pulse voltage is induced in the secondary L4 of a pulse transformer, which modifies the like-polarity voltages between electrodes 6 and 7 into opposite polarities, and thereby discharging this modified potential through the inductance L4. The diode D2 across inductance L4 is polarized to prevent oscillation of the induced pulse voltage in the inductance.

Figure 3:
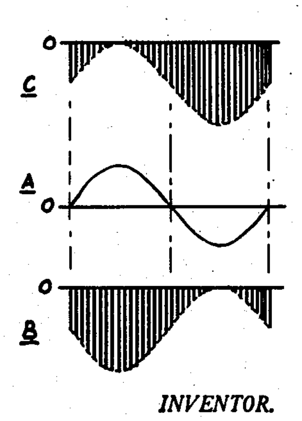
Fig. 3 shows graphically the waveforms involved at different points of the system.

The output signal is taken from across load resistor R1, for further amplification, if so desired. The graphical illustration in Fig. 3 shows the differences between input and output signals, wherein, A represents the waveform in transformer T1; B represents individual negative charges between target elements 5 and the parallel electrodes 6, 7; and C represents the output pulses as produced across load resistor R1.

When great many target elements are desired within a given target area, either the physical size of the target is increased, or the target elements are made of thinner material, the latter condition requiring an electron beam of very small diameter. Concentration of an electron stream into extremely small diameter is more easily obtained by a magnetic focusing field along the entire length of the projected beam. Such an arrangement is shown in Fig. 4, which in its overall shape is similar to the commercially known "Vidicon" type; but with special target therein.

Figure 4:
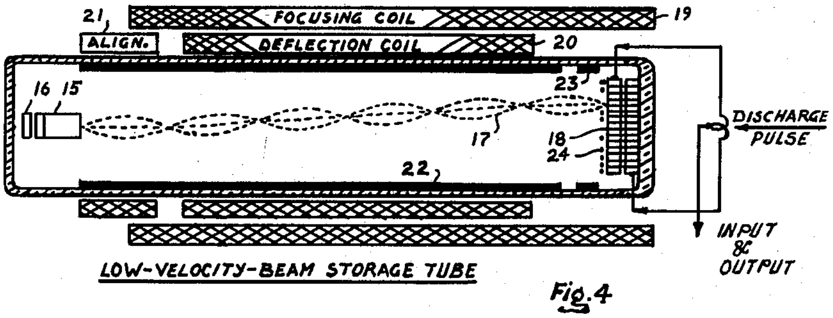
Fig. 4 is a modification of the storage tube arrangement of Fig. 2.

In Fig. 4, an electron gun 15, which includes a source 16 of electrons, projects a beam of electrons 17 upon target 18. The projected beam 17 is focused upon the target 18 by direct current (source not shown) passing in focusing coil 19, which produces a longitudinal magnetic field, substantially uniform throughout the region traversed by the stream of electrons 17. The beam 17 is deflected angularly upon target 18 by the magnetic deflection coil or coils 20 (depending upon singular or two dimensional deflection), through which are passed desired forms of beam-deflecting currents. In order to compensate for any mechanical misalignment between gun 15 and focusing coil 19, in directing the electron beam 17 substantially parallel to the focusing magnetic field, direct currents are passed through the alignment coil 21 for the necessary slight additional traverse magnetic fields in the vicinity of electron gun 15. The electron accelerating anode 22 encloses most of the space traversed by beam 17, maintaining it at a substantially uniform electrostatic potential, highly positive with respect to the cathode 16 potential. The decelerating ring 23 has a potential close to that of the cathode 16, so that the resulting electrostatic field will retard the electron velocity approaching the target 18. This low velocity of the beam is to avoid secondary emission from the target 18. In actual operation, however, the target 18 will be at positive potential with respect to the cathode (as shown in Fig. 2), and some secondary emission from the target elements will be inherently present, causing redistribution among adjacent target elements. If such redistribution is undesirable, it may be remedied by the addition of a suppressor grid 24, between the path of the electron beam and the target 18.

Figure 5:
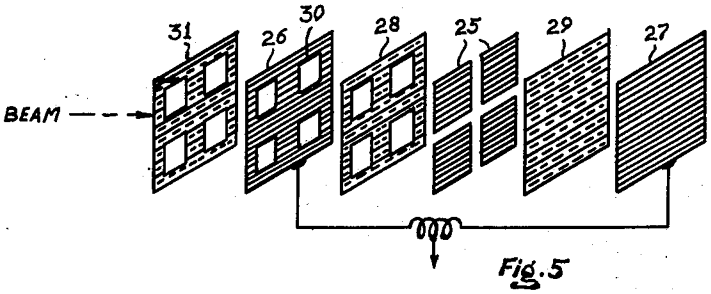
Figs. 5 to 7 are modifications of the storage target structure in accordance with the invention.

When two dimensional storage is desired, the target may be fashioned in the form as shown in an exploded view in Fig. 5, wherein, the target elements 25 are sandwiched between two electrodes 26 and 27, spaced by dielectric insulations 28 and 29. The electrode 26 contains holes 30 aligned with the target elements 25, but these holes are smaller than the target elements: first, to insure capacitive area between electrode 26 and the target elements 25; and second, to provide entrance for the electron beam to strike the target elements individually therethrough. The electrode 27 does not have to have holes therein, and its capacitance with respect to the target elements may be larger than of electrode 26, if so desired. It will be noted that the electrode 26 is in direct path of the electron beam, and direct current will pass therethrough. While this condition will not impair performance, it may be advantageous to insulate the surface of electrode 26 facing the electron beam, by the insulator 31. This insulating surface may be advantageously utilized as a suppressor grid, as designated by the numeral 24, in Fig. 4. The function of insulating layer 31, acting as a suppressor grid, is that, the surface of insulator 31 facing the beam is charged to cathode potential by the sweeping electron beam. This negatively charged surface tends to retard the velocity of any secondary electrons that try to escape from the original beam-impingement area on the target elements, and thereby avoiding redistribution over adjacent areas. This condition is also true with the arrangement of Fig. 2, wherein, the edges of electrode 6 facing the beam, may be coated with insulating material, for the same purpose just mentioned. To further prevent secondary emission, the surfaces of the target elements may be coated with non-emissive conducting material, if so desired.

Figure 6:
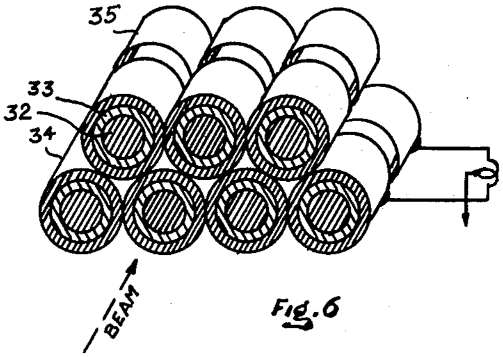

Fig. 6 shows how large capacitances may be secured between target elements and the two electrodes. In this case, the target is assembled with a large number of filament wires stacked in the fashion as shown. Each wire 32 is coated on its outer cylindrical surface with insulating dielectric 33, over which surface is metalized in two separate sections, 34 and 35. By stacking these composite wires in the fashion as shown, the metalized surfaces 34 will provide one output terminal, as of the first electrode, and the metalized surfaces 35 will provide another output terminal, as of the second electrode; the two of which are connected to end terminals of inductance, as shown.

Figure 7:
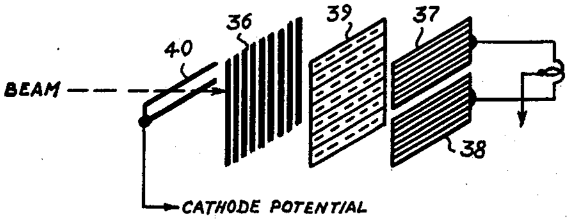

Fig. 7 is another modification of the target utilized in the arrangement of Fig. 2. In Fig. 7, the beam responsive target elements are shaped in the form of narrow metallic strips 36, which have capacitances to electrodes 37 and 38. While large capacitances may not be obtained by the narrow strips 36, the construction may be simpler, by first coating the inner wall of the glass face plate (not shown) of the tube with metal plates 37, 38; covering these metalized areas (37, 38) with thin coating of insulating dielectric 39; and over the layer of 39, metalizing in narrow strips 36, suitably by photographic methods. Since only singular dimension of beam scansion is employed in this case, another set of metallic coatings (37 and 38) may be applied over the metallic strips 36, with dielectric insulation therebetween, to increase the capacitive values between the strips 36 and electrodes 37, 38. Since also, scansion in singular dimension is employed in this case, the suppressor grid, as mentioned in the foregoing, may be in the form of a wire or loop 40, connected to cathode potential.

Because of the small capacitances obtainable between target elements and first and second electrodes, as inherent with the target structures of Figs. 5 and 7, the beam current may be small; in the order of several microamperes. Whereas with large capacitance of target elements, one milliampere of beam current may be required for charging the capacitors during storage time. As shown with the arrangement of Fig. 2, the current return path may have extremely low impedance value during charging time of the target elemental capacitors, whereas, this path may have very high impedance during reproduction time. Thus, the target structures of Figs. 5 and 7 will also offer many readings of the storage signal without appreciable deterioration; especially when the beam current is switched to low value during reading time.

The single dimensional scansion, such as by the arrangement of Fig. 2, is particularly useful for modifying a wave form, by first storing it in one time base period, and reproducing it in another time base period. One particular use that I would like to refer to, is in conjunction with the system disclosed in my Patent No. 2,708,688, May 17, 1955; and copending application Serial No. 723,510, March 24, 1958, for modifying speech sound waves, by first recording in one time base, and reproducing it in another time base.

With the various illustrations in the drawings, it is readily obvious to the skilled in the art that other modifications, adaptations, and substitutions of parts may be made without departing from the spirit and scope of the invention.

What I claim, is:

1. In a cathode beam storage device having a target of a plurality of beam responsive capacitive elements for storing plurality of independent electrical quantities upon impingement at different elements by said beam, a target comprising a plurality of mutually insulated beam responsive target elements in the path of said cathode beam; first and second electrodes remote from said beam, physically so arranged as each of said first and second electrodes to have mutually separated capacitances with respect to said plurality of beam responsive target elements, for causing simultaneous but independent storage charge of like-poled electrical quantities between the first and second electrodes upon impingement by said beam at any one of said beam responsive elements; and first and second output terminal means from said electrodes, respectively, for modifying and discharging said last stored electrical quantities externally of said device.

2. The system of storing, reproducing, and dissipating a plurality of independent electrical quantities on a target area, comprising means for projecting an electron beam; a target in the path of said beam, comprising a plurality of mutually insulated beam responsive target elements in the path of said beam, and first and second electrodes remote from the beam, physically so arranged as each of said first and second electrodes to have mutually independent capacitances with respect to said plurality of beam responsive target elements, for causing simultaneous but independent storage charges of like-poled electrical quantities between the first and second electrodes upon impingement by said beam at any one of said beam responsive elements; a low impedance coupling means for coupling said first and second electrodes in parallel; and means for producing a pulse voltage in said coupling means, thereby modifying said like-poled stored electrical quantities to opposite-poled quantities, and dissipating said last quantities through said low impedance coupling means.

3. The system of storing, reproducing, and dissipating a plurality of independent electrical quantities on a target area, comprising means for projecting an electron beam; a target in the path of said beam, comprising a plurality of mutually insulated beam responsive target elements in the path of said beam, and first and second electrodes remote from the beam, physically so arranged as each of said first and second electrodes to have mutually independent capacitances with respect to said plurality of beam responsive target elements, for causing simultaneous but independent storage charge of electrical quantities between the first and second electrodes upon impingement by said beam at any one of said beam responsive elements; first and second output terminals from said electrodes, respectively; a coupling means between said first and second terminals; a potential source and a potential-modulating source in series with said coupling means and said electron source; means for deflecting said beam upon said target, whereby said individual capacitors are charged and stored with electrical quantities during impingement of said beam, proportionally corresponding to said modulated potential; means for removing said modulating source and means for deflecting said beam for reproducing the stored quantities; and means for dissipating said stored quantities between said first and second terminals through said coupling means, for repeated storage.

4. The system as set forth in claim 3, wherein is included a beam velocity reducing electrode adjacent said target, for minimizing secondary emission from said target element, during said beam impingement, thereby reducing secondary electron distribution over adjacent elements.

5. The system as set forth in claim 3, wherein is included a suppressor grid between the path of said projected beam and said target, for substantially confining secondarily emitted electrons from said elements during said beam impingement to their original areas.

6. The target structure as in claim 1, wherein is included a suppressor grid between said path of the scanning electron ray and said target elements, for substantially suppressing secondary emission from said elements by the impingement of said scanning ray.

7. The system as set forth in claim 3, wherein said coupling means comprises an impedance means connected between said first and second terminals; and means for applying a voltage pulse across said impedance means during the period of said dissipation of said stored quantities, whereby first modifying said parallel storage between said first and second terminals into series storage, and allowing said last storage dissipate itself through said impedance means when said pulse starts returning in homeward direction.

8. The system as set forth in claim 3, wherein said coupling means comprises an inductance connected between said first and second terminals; means for producing a voltage pulse across said inductance during the period of said dissipation of said stored quantities, whereby first modifying said parallel storage between said first and second terminals into series storage, and allowing said last storage dissipate itself through said inductance when said pulse starts returning in homeward direction; and a diode means in parallel with said inductance, so polarized as to prevent reversal of said pulse voltage in the inductance.

9. The system as set forth in claim 3, wherein said modulating source comprises a normally inoperative gate and an impedance means in series with said coupling means; means for applying modulating voltage upon said impedance means during storage of said electrical quantities in said elemental capacitors, and means for simultaneously rendering said gate operative during said last period for said storage proportionally corresponding to said modulations.

10. The target structure as set forth in claim 1, wherein is included a suppressor grid between the path of said scanning beam and said plurality of said beam responsive elements.

11. The target structure as set forth in claim 1, comprising said plurality of beam responsive target elements in the form of mutually insulated individual ribbons in parallel planes with respect to each other, enclosed in plurality of folds of said first and second electrodes consisting of first and second electrically insulated conductor ribbons, respectively; and means for disposing said target structure so that the free edges of said elemental ribbons face said electron beam.

References Cited in the file of this patent

UNITED STATES PATENTS 2,874,328 Crost ------------------ Feb. 17, 1959